United States Patent
Nicoli Muschamp et al.

(10) Patent No.: US 11,732,821 B2
(45) Date of Patent: Aug. 22, 2023

(54) PROTECTION APPARATUS

(71) Applicant: Advanced Innergy Ltd., Gloucester (GB)

(72) Inventors: Mary Louise Nicoli Muschamp, Gloucester (GB); Martin Steven Harrop, Gloucester (GB)

(73) Assignee: ADVANCED INNERGY LTD., Gloucester (GB)

( * ) Notice: Subject to any disclaimer, the term of this patent is extended or adjusted under 35 U.S.C. 154(b) by 182 days.

(21) Appl. No.: 17/414,841

(22) PCT Filed: Dec. 9, 2019

(86) PCT No.: PCT/GB2019/053463
§ 371 (c)(1),
(2) Date: Jun. 16, 2021

(87) PCT Pub. No.: WO2020/128428
PCT Pub. Date: Jun. 25, 2020

(65) Prior Publication Data
US 2022/0042623 A1 Feb. 10, 2022

(30) Foreign Application Priority Data

Dec. 17, 2018 (GB) ...................................... 1820555

(51) Int. Cl.
*F16L 57/06* (2006.01)
*F16L 1/12* (2006.01)
*F16L 3/10* (2006.01)

(52) U.S. Cl.
CPC ............. *F16L 1/123* (2013.01); *F16L 3/1091* (2013.01); *F16L 57/06* (2013.01)

(58) Field of Classification Search
CPC .......... F16L 11/118; F16L 57/00; F16L 57/02; F16L 11/18; F16L 27/0853; F16L 1/123;
(Continued)

(56) References Cited

U.S. PATENT DOCUMENTS 1,054,904 A * 3/1913 Carpenter ............. E21B 17/046
285/330
1,822,624 A * 9/1931 Hoeftmann .............. H01B 7/20
174/136
(Continued)

FOREIGN PATENT DOCUMENTS

EP 1616377 A1 2/2007
EP 3073170 A1 9/2016
(Continued)

OTHER PUBLICATIONS

"International Search Report and Written Opinion of the International Searching Authority for PCT Patent Application No. PCT/GB2019/053463", dated Feb. 27, 2020, 16 Pages.
(Continued)

*Primary Examiner* — Patrick F Brinson
(74) *Attorney, Agent, or Firm* — Calfee, Halter & Griswold LLP

(57) ABSTRACT

Protection apparatus for a flexible elongate member. The apparatus comprises a plurality of protection members 10. Each protection member 10 defines an opening 22 through which a flexible elongate member can extend. Each protection member 10 is interconnectable end to end with other such protection members 10 to provide protection along the length of an elongate member. Each protection member 10 comprises two parts 12 which are mountable together to define the opening 22 through which an elongate member can extend. The two parts 12 together form a female formation 18 at one end, and a male formation 20 at the other end, such that the female formation 18 can receive a male formation 20 on an adjacent protection member 10 to interconnect the adjacent projection members 10. The female and male formations 18, 20 are configured to permit
(Continued)

a predetermined amount of relative pivotal movement between adjacent protection members 10.

19 Claims, 12 Drawing Sheets

(58) Field of Classification Search
CPC .. H02G 1/10; H02G 9/06; H02G 9/02; H02G 3/04; H02G 9/065
USPC ..... 138/120, 155, 110, 128, 156; 285/146.1, 285/261, 419
See application file for complete search history.

(56) References Cited

U.S. PATENT DOCUMENTS

| | | | |
|---|---|---|---|
| 5,215,338 A | 6/1993 | Kimura et al. | |
| 5,832,960 A * | 11/1998 | Amatsutsu | H02G 3/0487 138/155 |
| 5,986,215 A | 11/1999 | Watanabe et al. | |
| 6,682,103 B1 * | 1/2004 | Poirier | H02G 9/02 285/146.1 |
| 7,100,641 B2 * | 9/2006 | Tyrer | H02G 3/0481 138/158 |
| 8,607,826 B2 * | 12/2013 | Krohn | F16L 57/02 138/155 |
| 9,163,463 B2 * | 10/2015 | Smith | F16L 1/123 |
| 10,443,762 B2 * | 10/2019 | Van Belkom | F16L 1/123 |
| 11,072,978 B2 * | 7/2021 | Stewart | E21B 17/105 |
| 2010/0147529 A1 * | 6/2010 | Mungall | E21B 43/0107 405/224.4 |
| 2010/0228295 A1 | 9/2010 | Whitefield | |
| 2012/0024412 A1 * | 2/2012 | Bertelo | F16L 11/18 138/110 |
| 2016/0145948 A1 * | 5/2016 | Pezet | E21B 17/01 166/350 |
| 2017/0328509 A1 * | 11/2017 | Meijer | H02G 1/10 |
| 2019/0017644 A1 * | 1/2019 | Whitefield | F16L 11/18 |

FOREIGN PATENT DOCUMENTS

| | | |
|---|---|---|
| EP | 2096729 A1 | 9/2020 |
| WO | 0124336 A1 | 4/2001 |
| WO | 2013147928 A1 | 10/2013 |
| WO | 2016102707 A1 | 6/2016 |
| WO | 2020128428 A1 | 6/2020 |

OTHER PUBLICATIONS

"Search Report for UK Patent Application No. GB1820555.9", dated Jun. 1, 2020, 3 Pages.

\* cited by examiner

PROTECTION APPARATUS

This invention concerns protection apparatus for elongate members, and particularly but not exclusively for elongate members such as cables or pipes which may be used in offshore locations.

In a number of situations it is required to provide protection against impact and/or abrasion to elongate members such as cables or pipes. One such application is for cables extending to and from offshore wind turbines. Such cables or pipes typically extend along the sea floor, and will thus be subject to waves and tides which can cause damage thereto. Protection for elongate members leading to hydrocarbon and other offshore facilities may also be required. When such cables are installed in offshore situations, often this can only be carried out in particular weather and/or sea conditions. It is generally therefore desirable that such cables or pipes can readily be installed for instance by feeding from the back of a boat, when appropriate conditions apply.

According to a first aspect of the invention there is provided protection apparatus for a flexible elongate member, the apparatus comprising a plurality of protection members, each protection member defining an opening through which a flexible elongate member can extend, with each protection member being interconnectable end to end with other such protection members to provide protection along the length of an elongate member, each protection member comprising two parts which are mountable together to define the opening through which an elongate member can extend, with the two parts together forming a female formation at one end, and a male formation at the other end, such that the female formation can receive a male formation on an adjacent protection member to interconnect the adjacent projection members, with the male and female formations being configured to permit a predetermined amount of relative pivotal movement between adjacent protection members.

The two parts of the protection member may be at least generally identical, and may be identical.

The male and female formations may be configured such that once a male formation is located in a female formation, the adjacent protection members are retained in an interconnected condition, and can only be separated if the two parts of a one of the protection members are separated.

The male and female formations may provide a ball and socket interconnection between adjacent protection members. The male and female formations may be configured such that at a maximum relative inclination between adjacent protection members, there are three separate points of contact between the male and female formations.

The three separate points of contact may be between: an outer end of the male formation and an inner part of the female formation; and an outer end of the female formation and an inner end of the male formation, both on the inside of the inclination, and the outer ends of the male and female formations at the outside of the inclination.

Inter engageable formations may be provided between the two parts of each protection member. The inter engageable formations may provide a snap fit. The inter engageable formations may be integrally formed with the remainder of each part of the protection member. Alternatively separate connecting members may be provided extendible through respective alignable openings on each part of the protection member.

The male formation may have a part spherical profile with an outer rim. The outside of the male formation outer rim may provide at a maximum relative inclination one of the points of contact on the inside of the inclination. The inside of the male formation outer rim may provide the point of contact on the outside of the inclination.

The female formation may have a part spherical profile with an outer rim. The outside of the female formation outer rim may provide at a maximum relative inclination one of the points of contact on the inside of the inclination.

Each protection member may comprise a generally cylindrical body, with the male and female formations at respective ends of the cylindrical body. The cylindrical body may be waisted.

The exterior of the cylindrical body may be provided by a plurality of ribs, with recesses defined between the ribs.

Filler material may be located in at least some of the recesses. The filler material may be either lighter or heavier than water to respectively provide buoyancy or assist with sinking in water and on bottom stability. The filler material may be of a material which provides abrasion protection. The filler material may be provided on one side only of the protection members to provide orientation thereof in water.

The protection members may be made of a polymer or plastics material and may have a density of between 950 and 1150 $kgm^{-3}$, and more particularly between 980 and 1050 $kgm^{-3}$.

The protection members may be made of a corrosion resistant material for use in subsea environments.

The protection members may be made of a plastics material, and may be made of polypropylene, which may be glass reinforced.

The protection members may be formed by injection moulding. Alternatively the projection members may be made of sheet moulding compound (SMC) or cast PU.

A band may be provided around the outside of each female formation to ensure a respective male formation is retained therein.

Embodiments of the present invention will now be described by way of example only and with reference to the accompanying drawings, in which.

Figure 1:
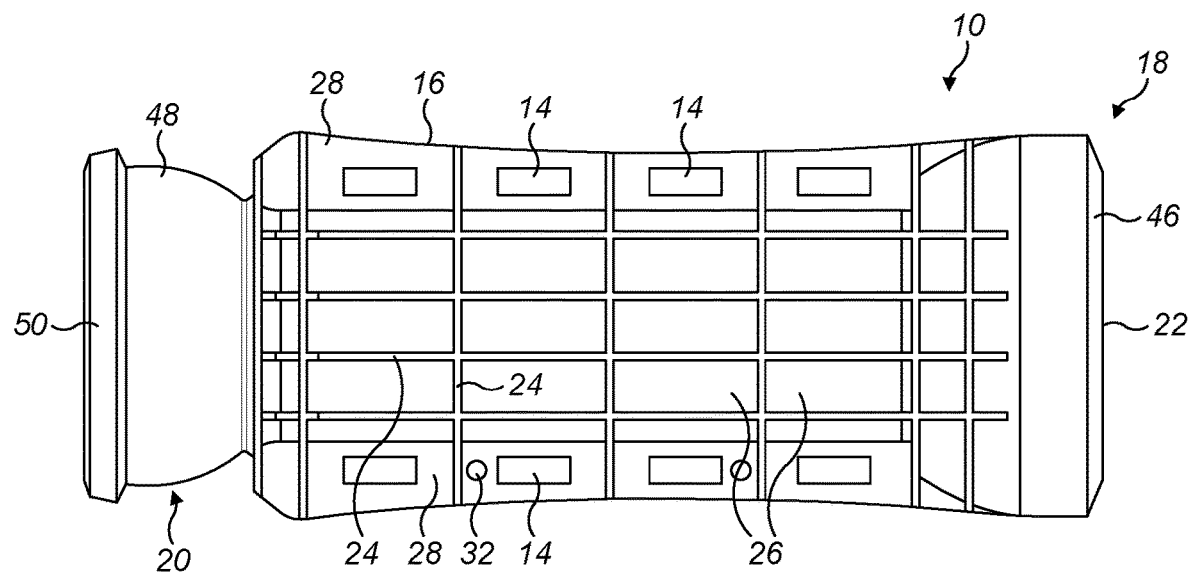
FIG. 1 is a diagrammatic plan view of a protection member according to the invention.
Figure 2:
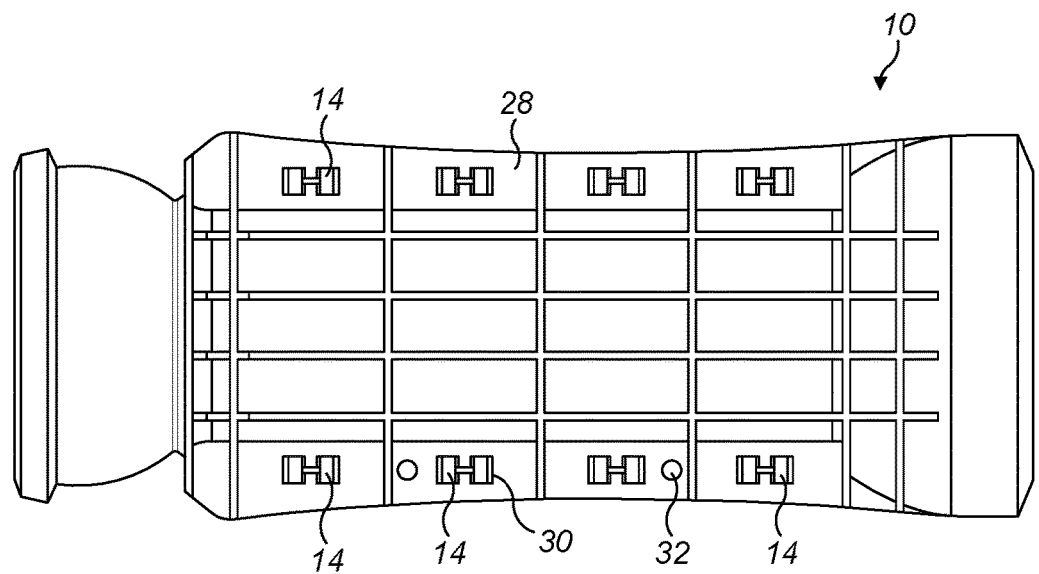
FIG. 2 is a diagrammatic view from beneath of a protection member according to the invention.
Figure 3:
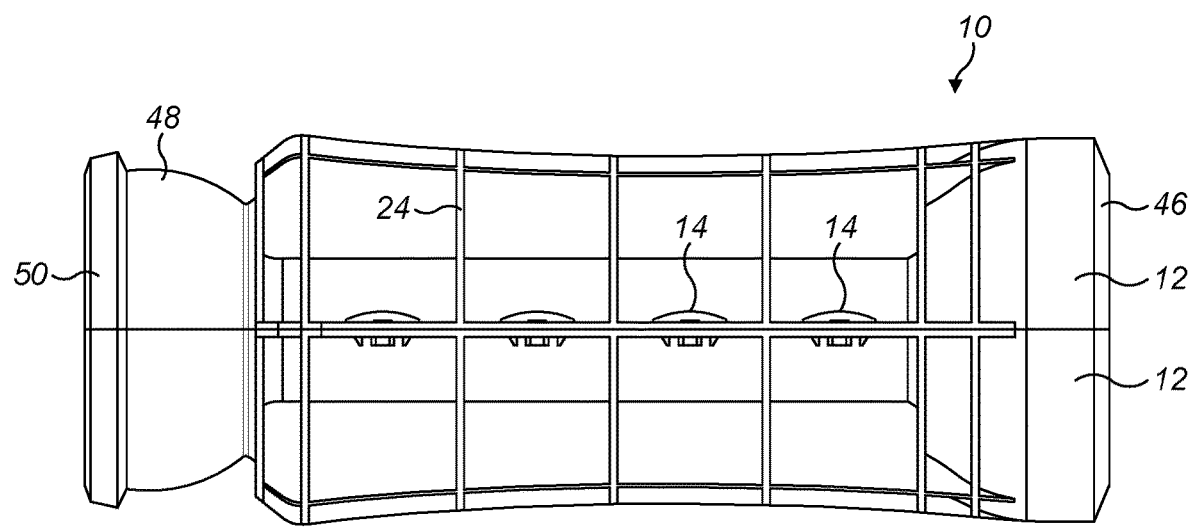
FIG. 3 is a diagrammatic side view of the protection member of FIG. 1.
Figure 4:
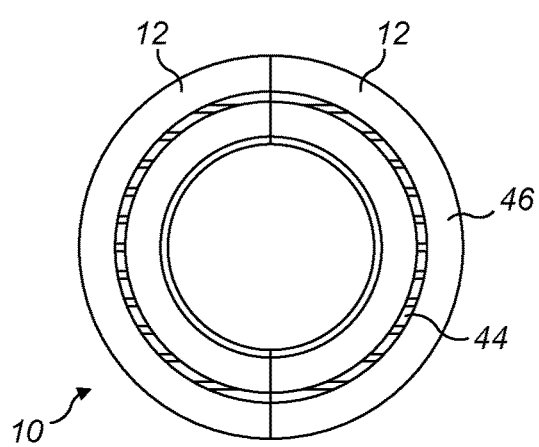
FIG. 4 is a diagrammatic first end view of the protection member of FIG. 1.
Figure 5:
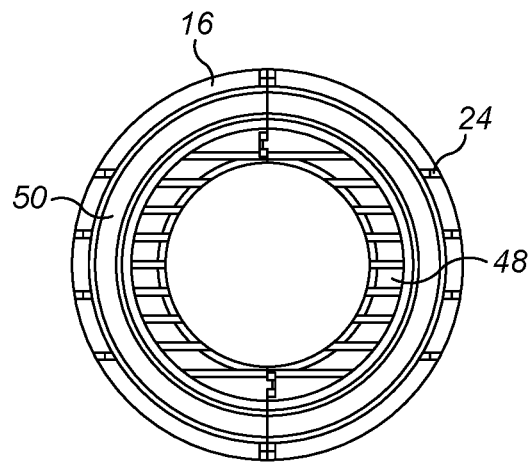
FIG. 5 is a diagrammatic second end view of the protection member of FIG. 1.
Figure 6:
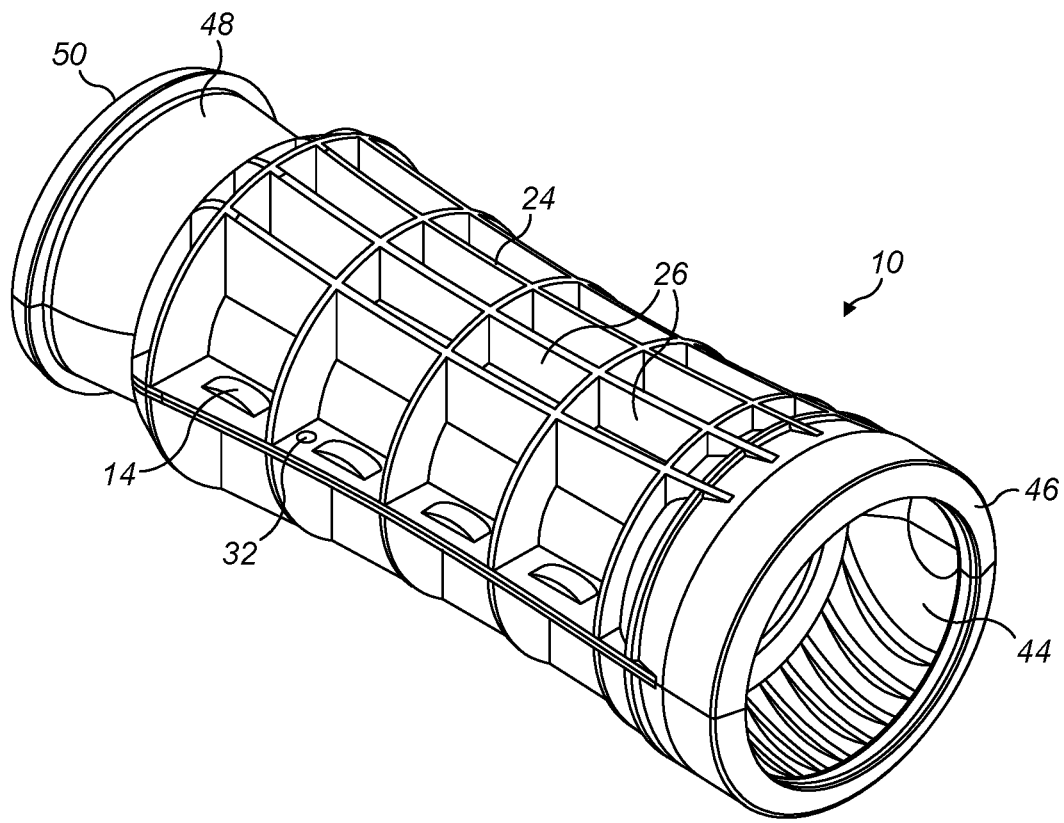
FIGS. 6 and 7 are diagrammatic perspective views of the protection member of FIG. 1 from the first end.
Figure 7:
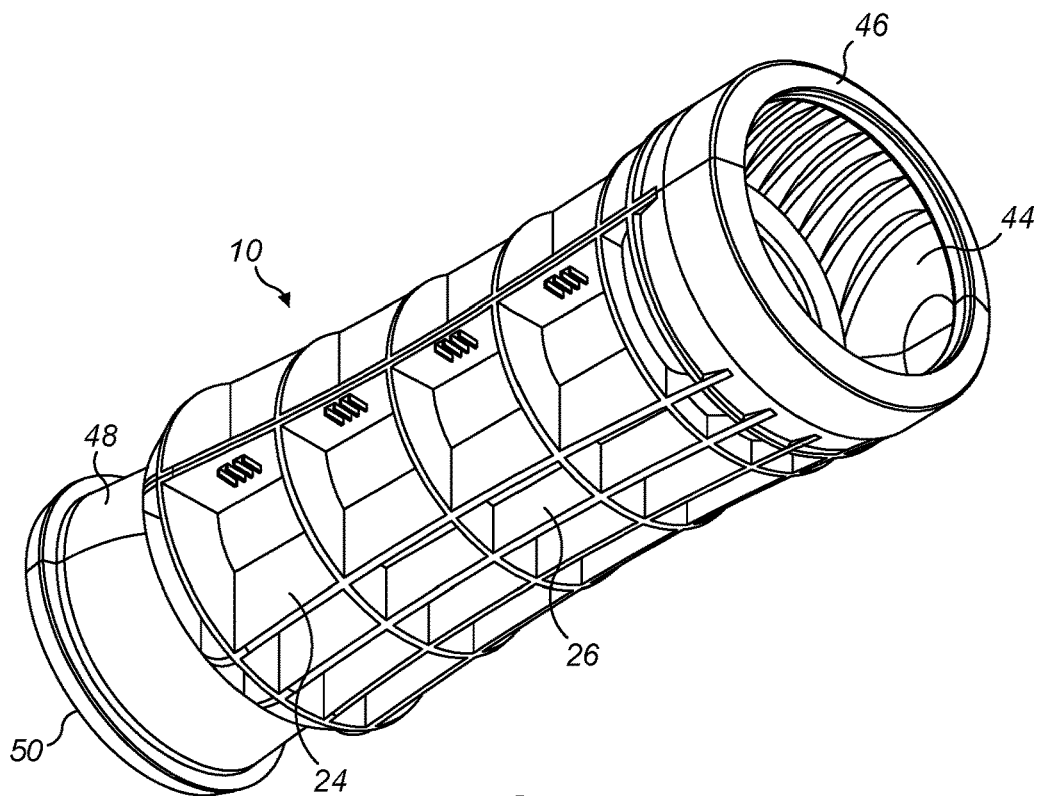
Figure 8:
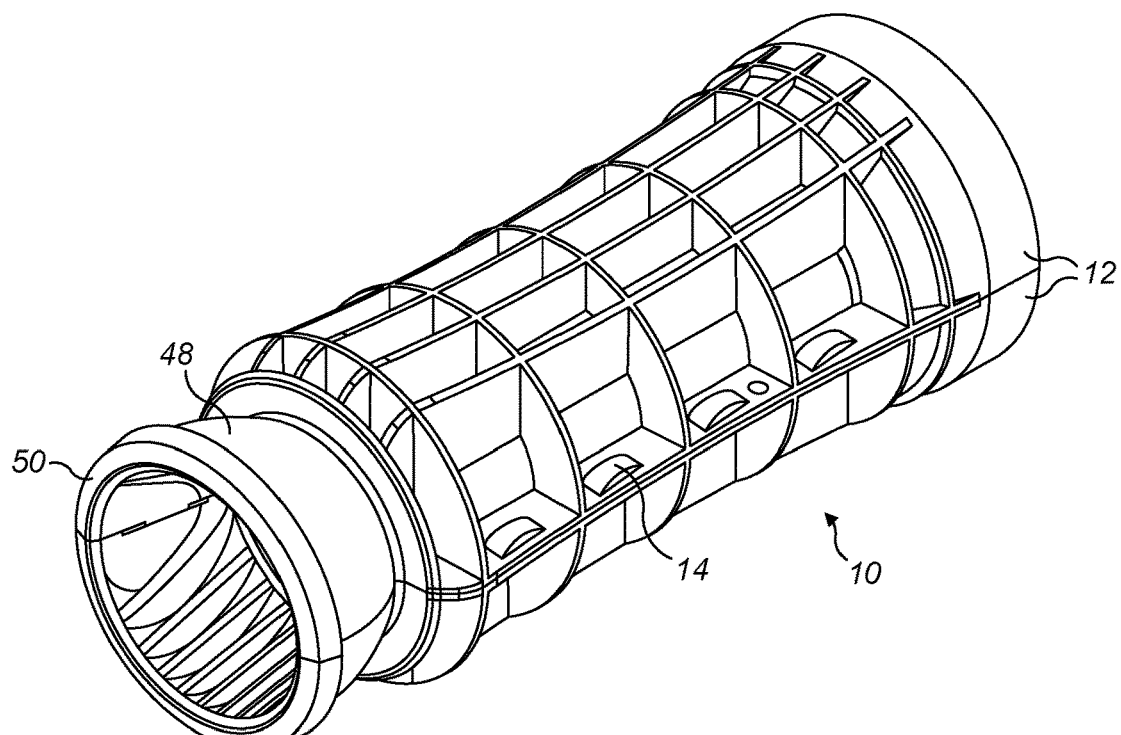
FIGS. 8 and 9 are diagrammatic perspective views of the protection member of FIG. 1 from the second end.
Figure 9:
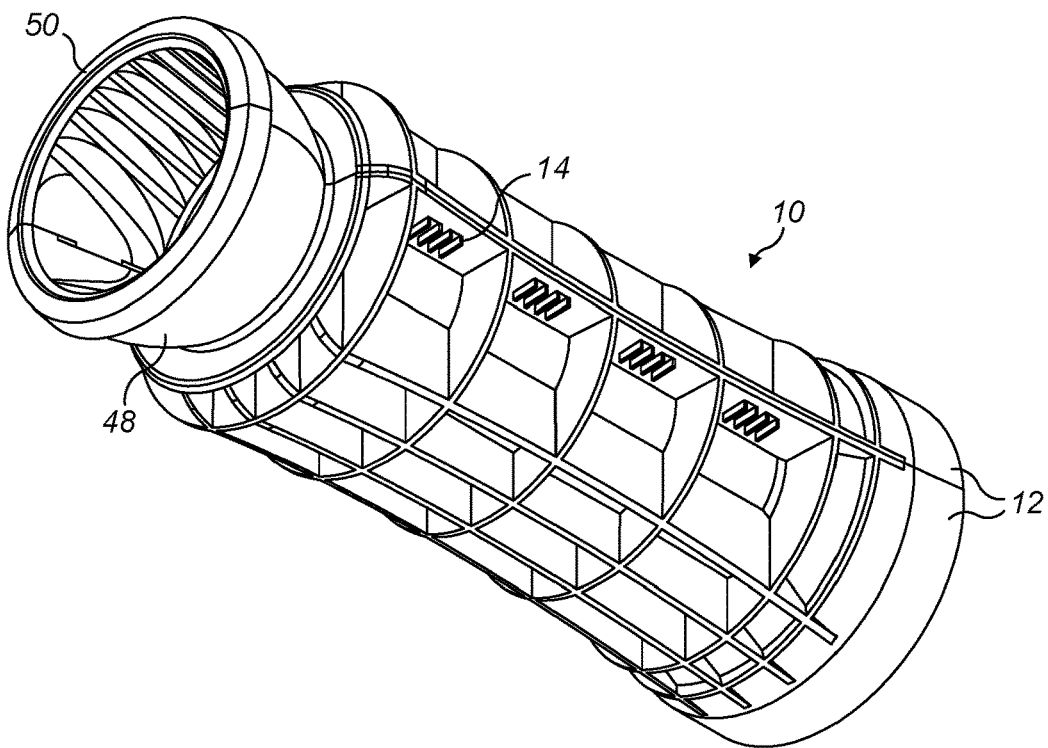
Figure 10:
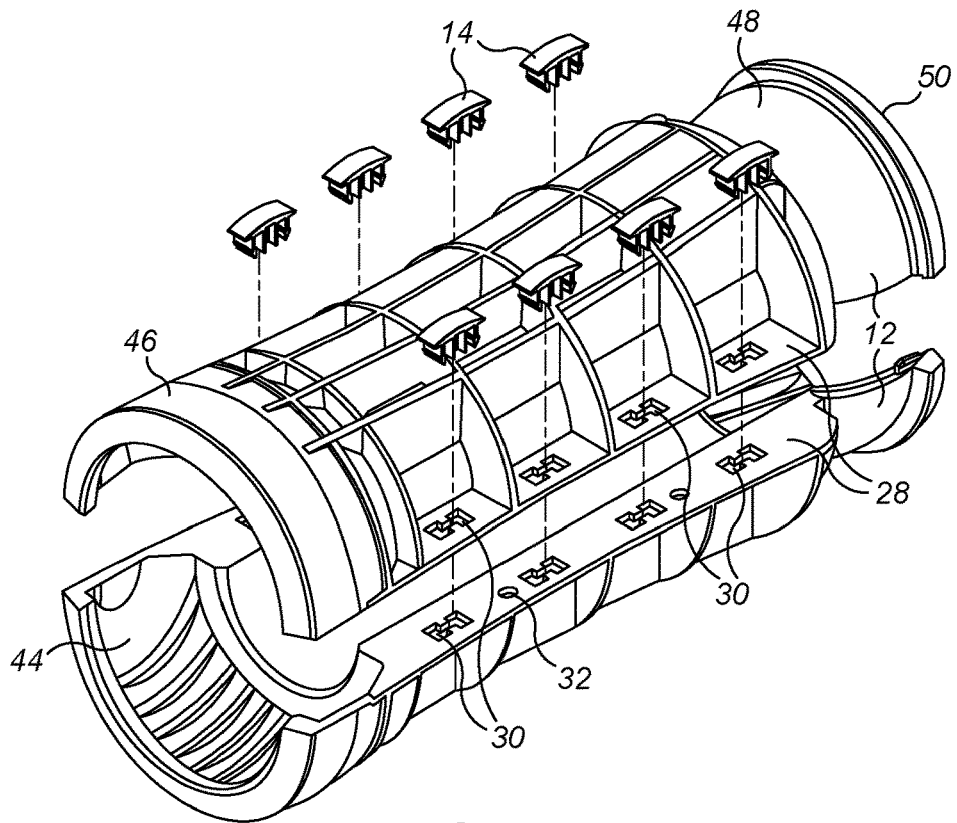
FIG. 10 is a diagrammatic perspective exploded view of the protection member of FIG. 1 from the first end.
Figure 11:
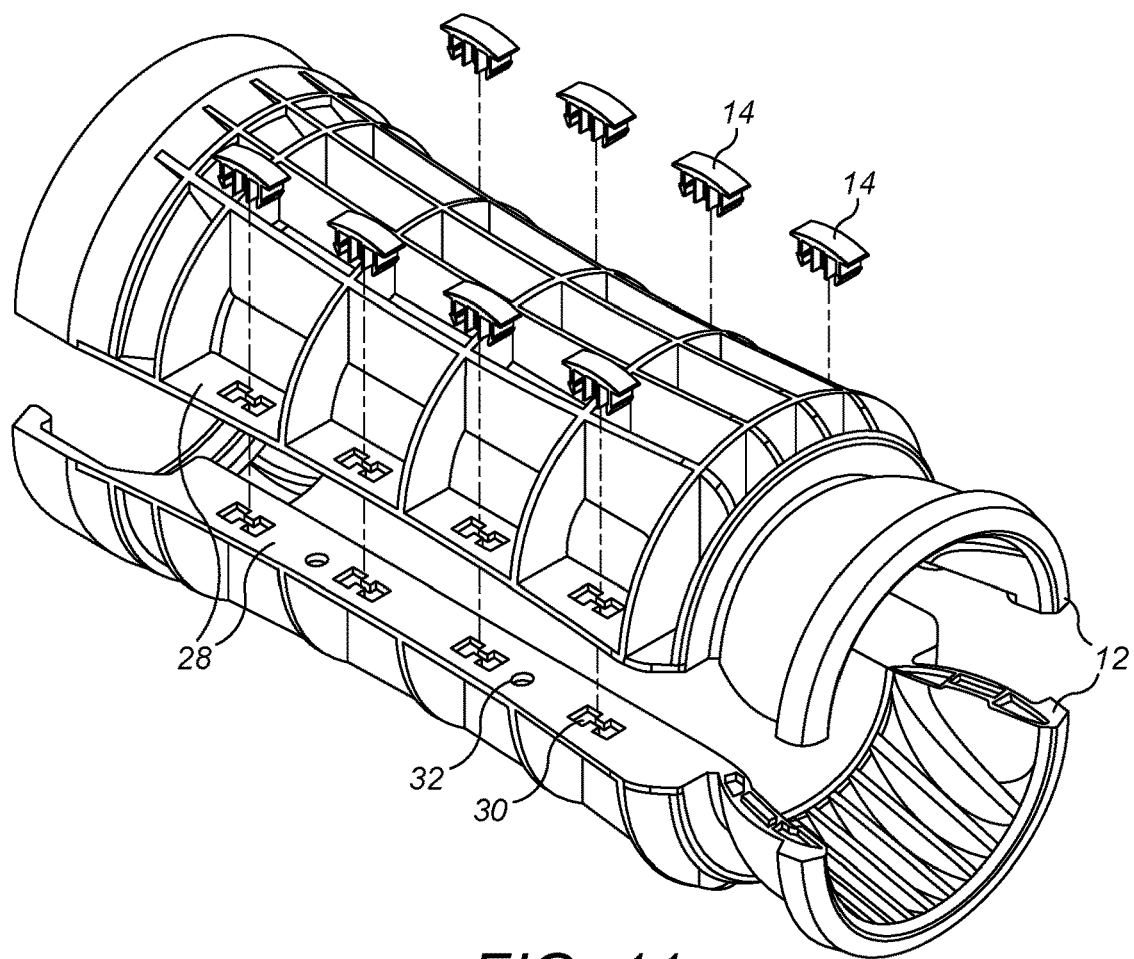
FIG. 11 is a diagrammatic perspective exploded view of the protection member of FIG. 1 from the second end.

The apparatus shown in the drawings is suitable for use in offshore conditions such as for instance for protecting pipes or cables extending to a wind turbine, or for instance in use in offshore hydrocarbon production facilities.

The apparatus comprises a plurality of interconnected protection members 10. Each protection member is formed from two interconnected identical halves 12 which are held together by a plurality of clips 14. The protection members 10 are made of a suitable material for offshore use such as polypropylene, which may be glass reinforced to provide extra strength. The members 10 can then be made by injection moulding. The material may have a density of around 1025 kgm$^{-3}$, so as to be buoyancy neutral in water. Alternatively the protection members may be made off sheet moulding compound (SMC) or cast PU.

Each protection member 10 has a generally cylindrical body 16 with a female formation 18 at a first end, and a male formation 20 at the second end. A through passage 22 is provided in the protection member 10, through which a cable, pipe or other flexible elongate member can extend. As can be seen in the drawings, the body 16 is gently waisted.

The body 16 has an outer profile of ribs 24 extending perpendicularly to each other, thereby defining recesses 26 therebetween. The two parts 12 of the body 10 are interconnected by respective engaging flanges 28 on each side. As can be seen four H shaped alignable openings 30 are provided in each flange 28. Also on one flange 28 on each body part 12 a pair of circular openings 32 are provided, whilst on the other flange 28 a pair of corresponding cylindrical projections 34 are provided. This means that the two parts 12 can be aligned together with the respective projections 32 entering the respective cylindrical openings 32.

Figure 12:
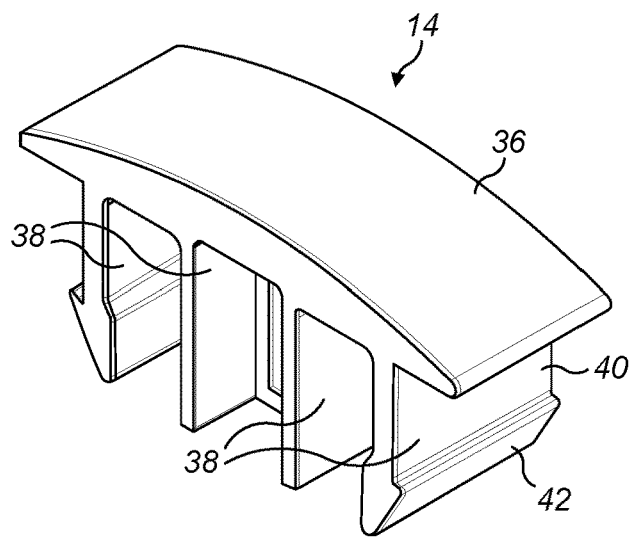
FIG. 12 is a diagrammatic perspective view of a component of the protection member of FIG. 1.
Figure 13:
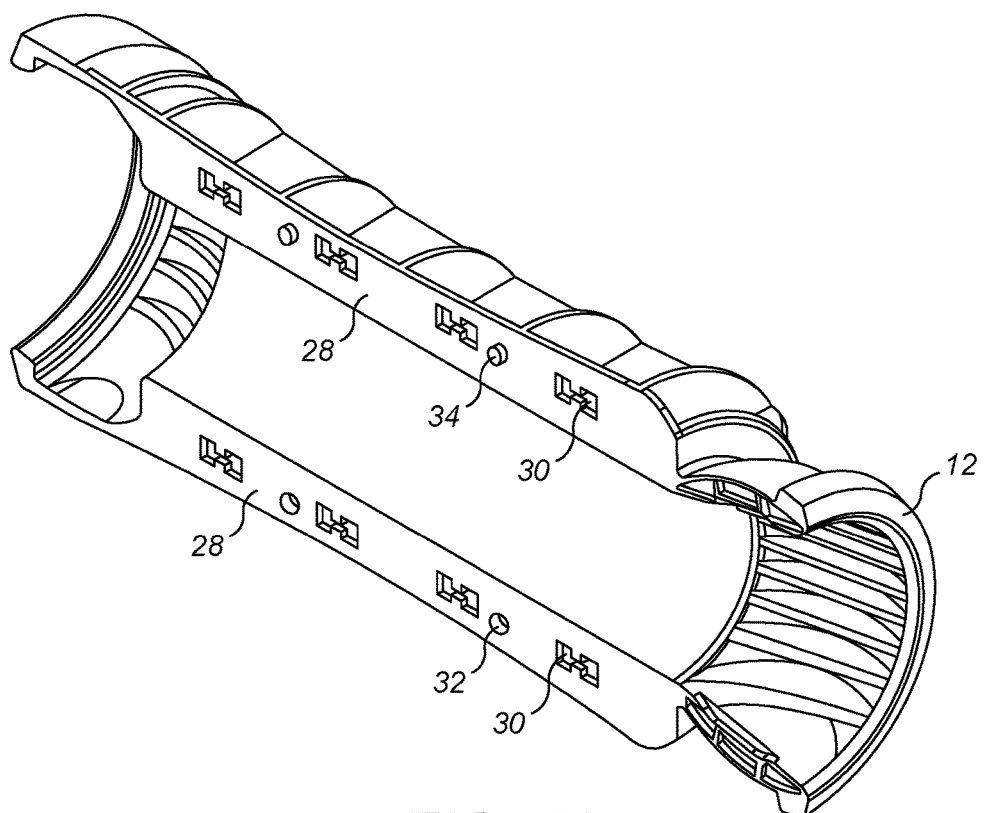
FIG. 13 is a diagrammatic perspective view from the second end of part of the protection member of FIG. 1.
Figure 14:
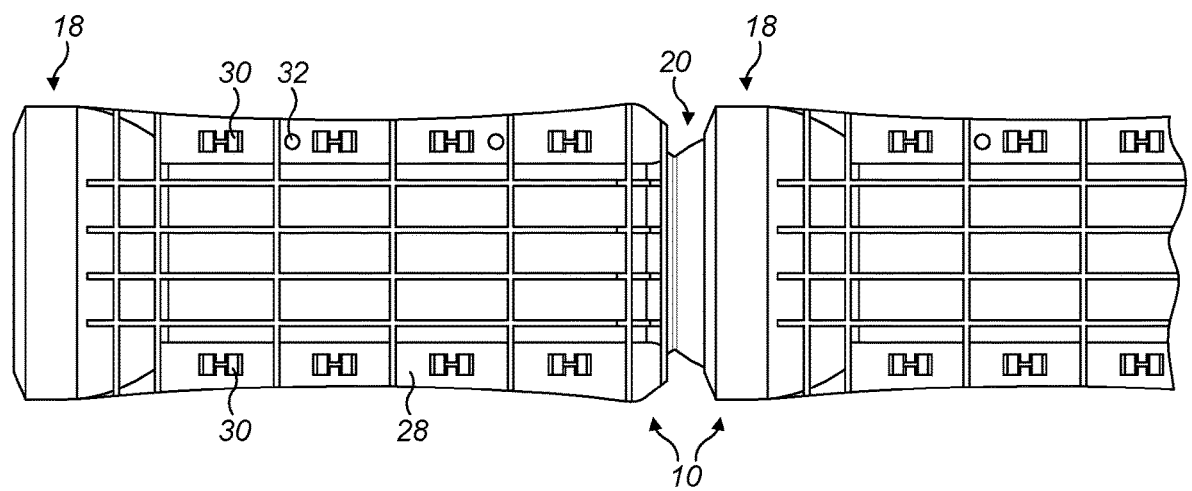
FIG. 14 is a diagrammatic side view of two protection members according to FIG. 1 joined together.
Figure 15:
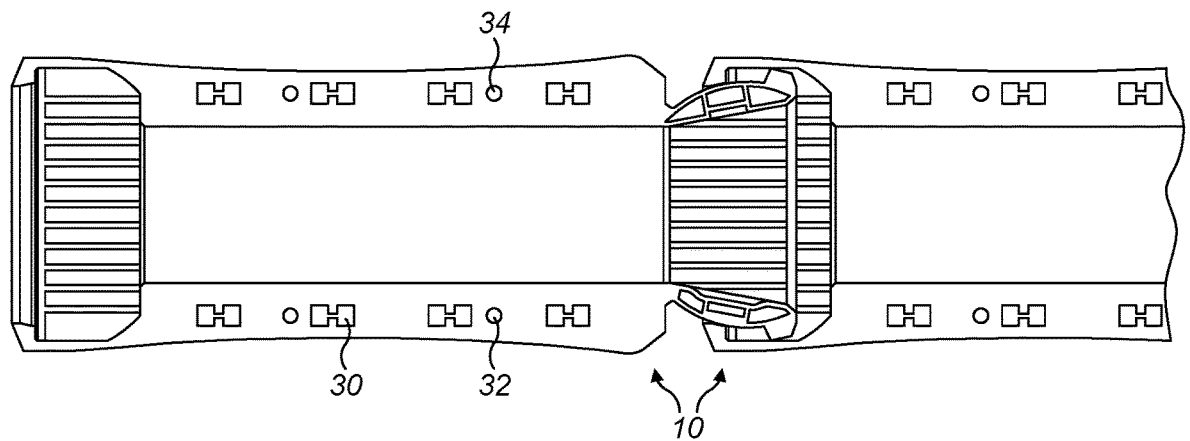
FIG. 15 is a similar view to FIG. 14 but in cross section.
Figure 16:
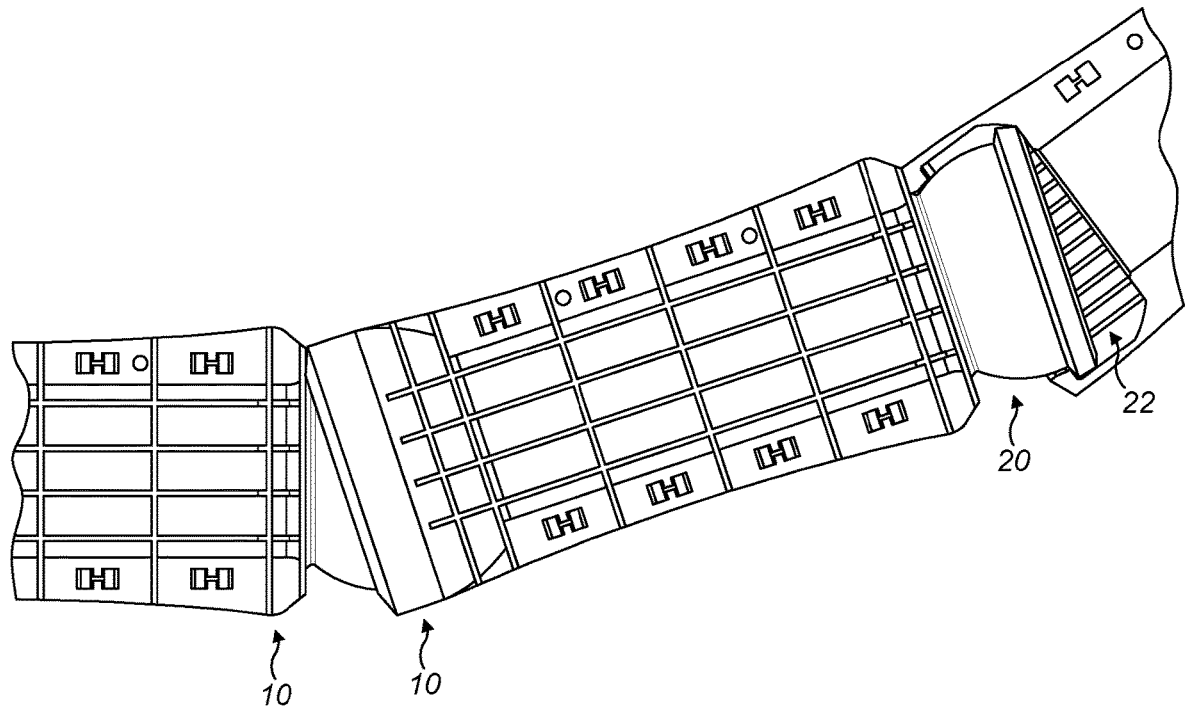
FIG. 16 is a diagrammatic partially plan and partially sectional view of three protection members according to claim 1 interconnected and inclined relative to each other.

The snap fit clips 14 are shown for instance in FIG. 12 which engage between the respective H shaped openings 30 in the flanges 28. The clips 14 comprise a gently domed top 36 to avoid snagging, and two pairs of spaced downwardly extending walls 38, with each outer one 40 of the walls 38 having an outwardly pointing detent 42. Each pair of spaced walls 38, is configured such that they can be urged together to pass through a respective part of the stem of one of the rectangular shaped openings 30, but once through the opening 30 the opposed walls will flex apart such that the detents 42 on each side retain the clip 34 in position, and hence the two parts 12 of the protection member 10 are held together. In FIGS. 14 to 17 of the drawings, the clips 14 have been omitted for clarity.

The female formation 18 at the first end has a part spherical recess 44 with an outer inwardly extending rim 46. The male formation 20 at the second end has a part spherical projection 48 with an outwardly extending outer rim 50. The projection 48 is of a size to form a ball and socket joint within recess 44 of the female formation 18.

The protection members 10 can be interconnected end to end by joining together of the two parts 12, with each female formation 18 being joined together around a respective male formation 20. The female and male formations 18, 20 are formed so as to permit limited pivotal movement between adjacent protection members 10. For instance the protection members 10 could be 75 cm long, and the maximum amount of relative pivotal movement could provide a radius of curvature of 2 M.

Figure 17:
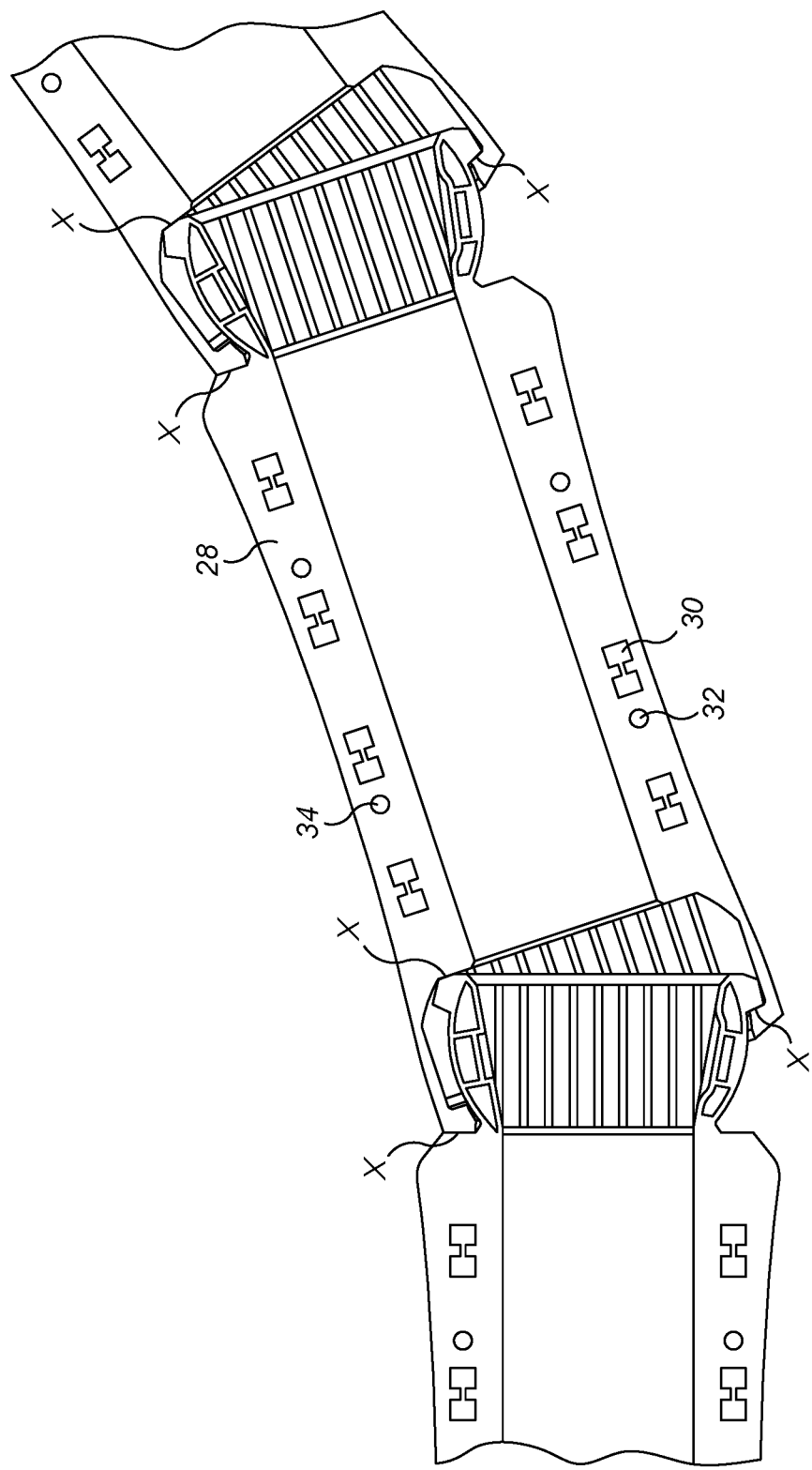
FIG. 17 is a similar view to FIG. 16 but in cross section.

At the maximum amounted of relative pivotal movement between adjacent members 10, as can be seen particularly in FIG. 17, there are three points of contact X between the female and male formations 18, 20. These points of contact X are in the inner side of the inclination, the outside of the outer rim 48 of the male formation engaging against the inner end of the female formation 18; and the outer end on the rim 46 of the female formation 18 engaging against the end of the body 16 of the adjacent protection member 10. On the outer side of the inclination the inner edge of the outer rim 48 of the male formation 20 engages against the inner side of the rim 46 on the female formation 18.

Figure 18:
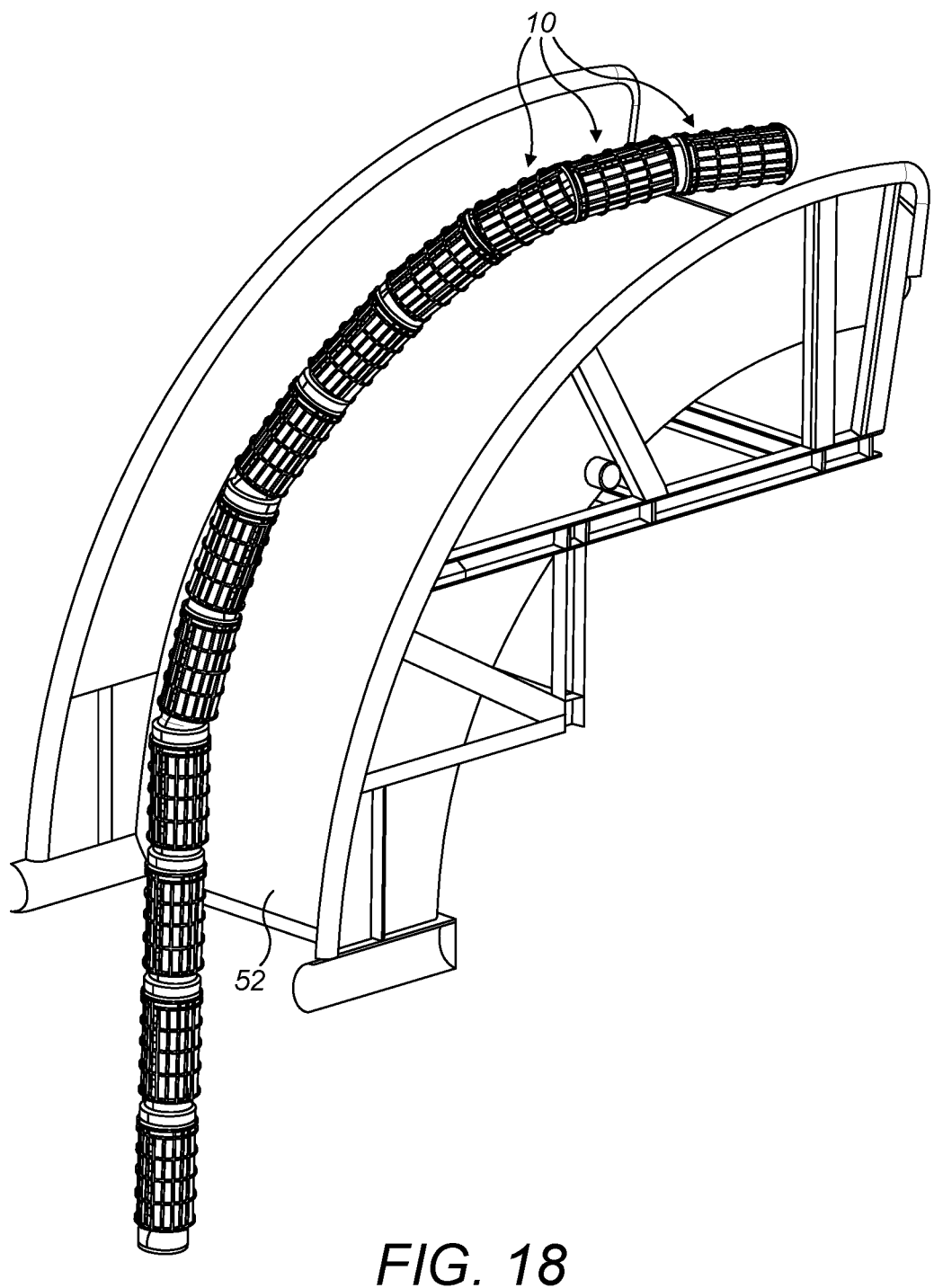
FIG. 18 is a diagrammatic perspective view showing part of a protection apparatus according to the invention being used to protect cables, pipes or other elongate members.
Figure 19:
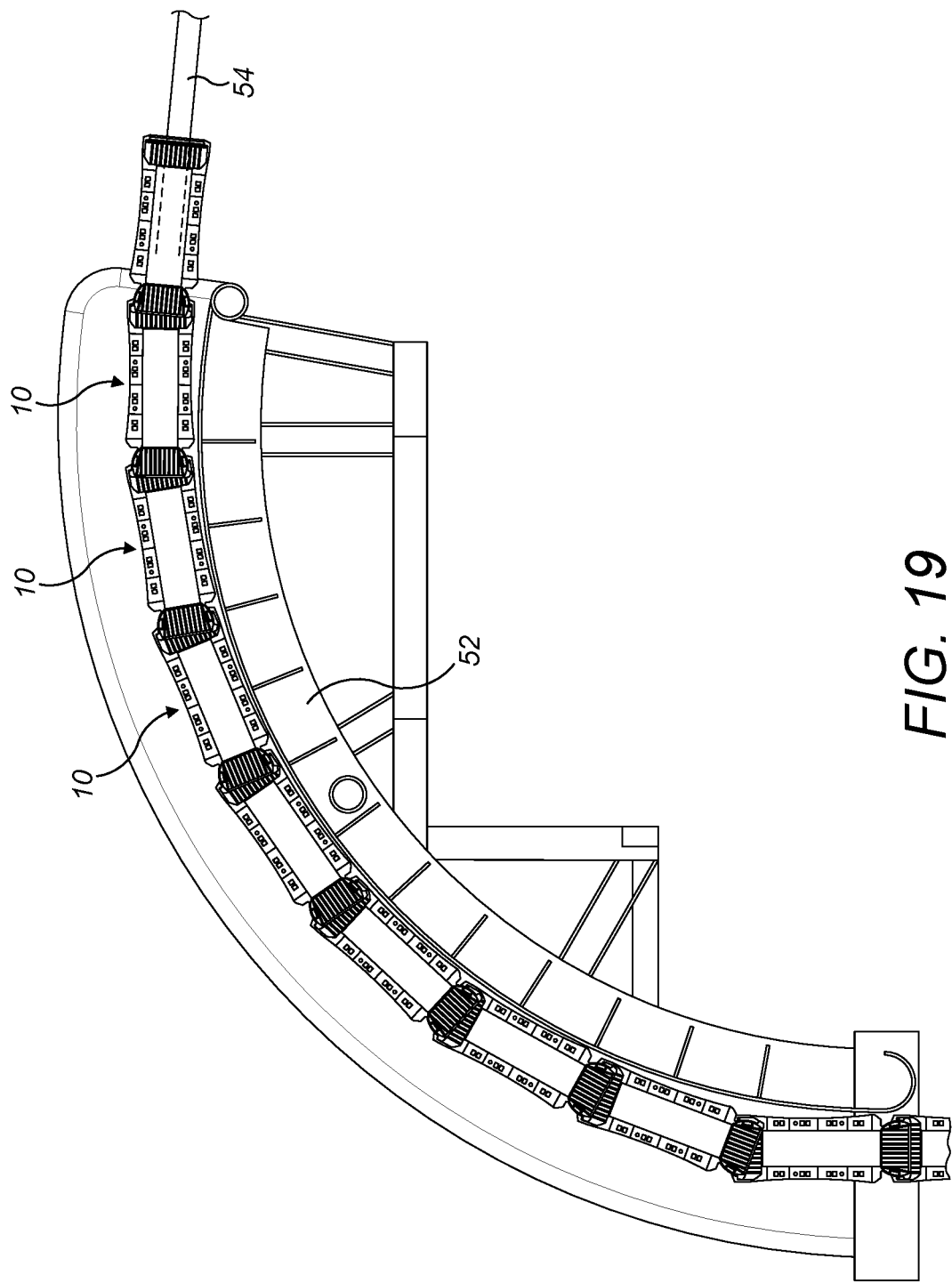
FIG. 19 is a similar view to FIG. 18 but from the side and in cross section.

FIGS. 18 and 19 diagrammatically show a string of protection members 10 joined together and being installed, i.e. "over boarded", for instance from a vessel over a chute 52. A cable 54 may be provided extending through the protection members 10, as diagrammatically shown at one end in FIG. 19. Alternatively the protection apparatus can be located in place, and a cable or pipe subsequently fed through the protection members 10.

There is thus provided a protection apparatus which provides a number of advantageous features. The apparatus provides good abrasion and impact resistance for an elongate member extending therethrough. Limited relative bending of the cable is allowed by the limited pivotal movement between adjacent projection members, and the three points of contact provide for a strong resistance against any further bending.

In some instances if required a band may be provided around the female formations to ensure that the respective male formations are retained therein. The apparatus is relatively light and can thus readily be manually handled. This is in contrast to some prior arrangements which have used cast iron and require the use of cranes during installation. Such cranes can be in short supply and not necessarily in a required location on boats used for laying such cables and the like.

The two parts of the protection members can readily be handled and stored as required. The two parts can also readily be joined together, and end to end with adjacent members, as required.

A number of advantages are provided by the rib structure. For instance, in the event of an impact this may perhaps cause a rib or two to break but leave the remainder of the body intact. If required materials can be located in at least some of the recesses defined by the ribs. If flotation is required, then relatively light materials could be located in at least some of the ribs. If such materials are only provided on one side of the protection members this can provide for an orientation thereof. Alternatively it may be required to ensure that the apparatus sinks, and this may particularly be the case if the cables themselves are not particularly heavy. In such an instance a relatively dense material can be provided in at least some of the recesses. Again if such material is provided in the recesses on one side, this provides for an alignment of the cable.

The rib arrangement will tend to prevent snagging taking place particularly when feeding the cable off a vessel. In use the recesses defined by the ribs will tend to fill with sediment so as to improve the bottom stability of the apparatus on the sea bed.

The waisting of the protection member bodies helps the apparatus to be fed over a chute or otherwise, as shown for instance in FIG. 19, where it can be seen that it is the ends of the apparatus which contact the chute, rather than the mid sections of the protective members.

Figure 20:
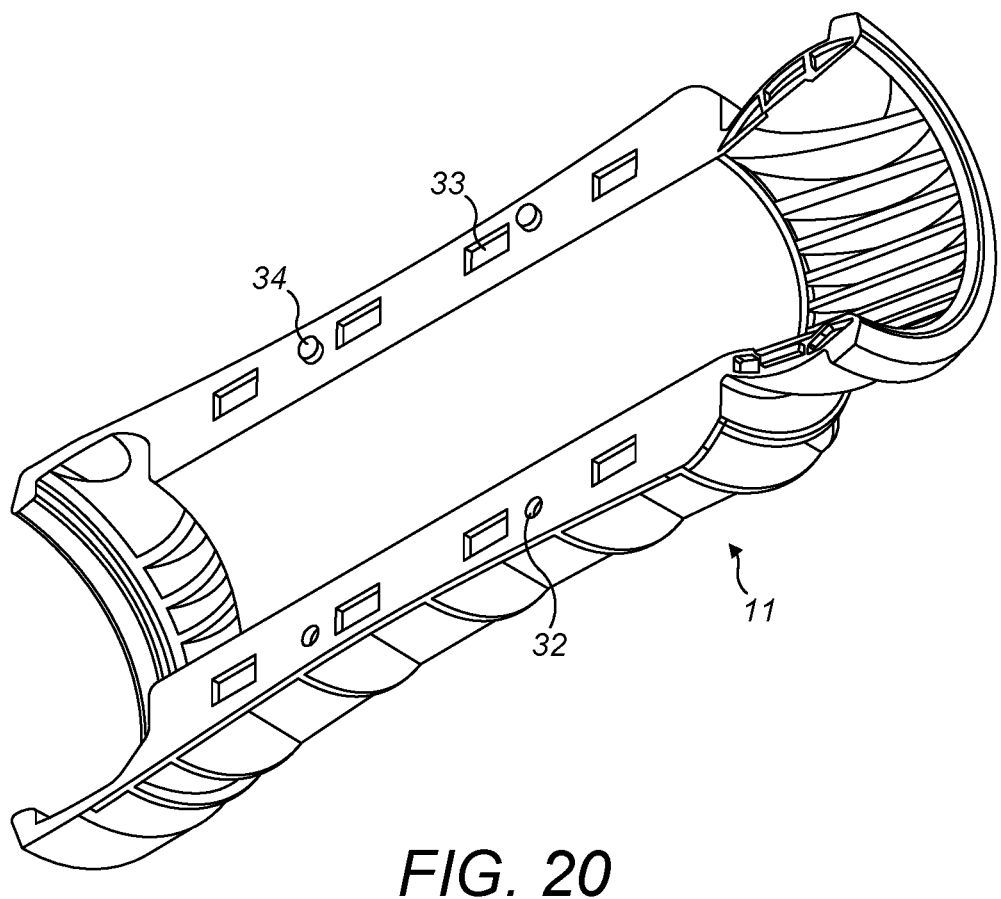
FIGS. 20 and 21 are respectively generally similar views to FIG. 13 and part of FIG. 15, but of a modified arrangement.
Figure 21:
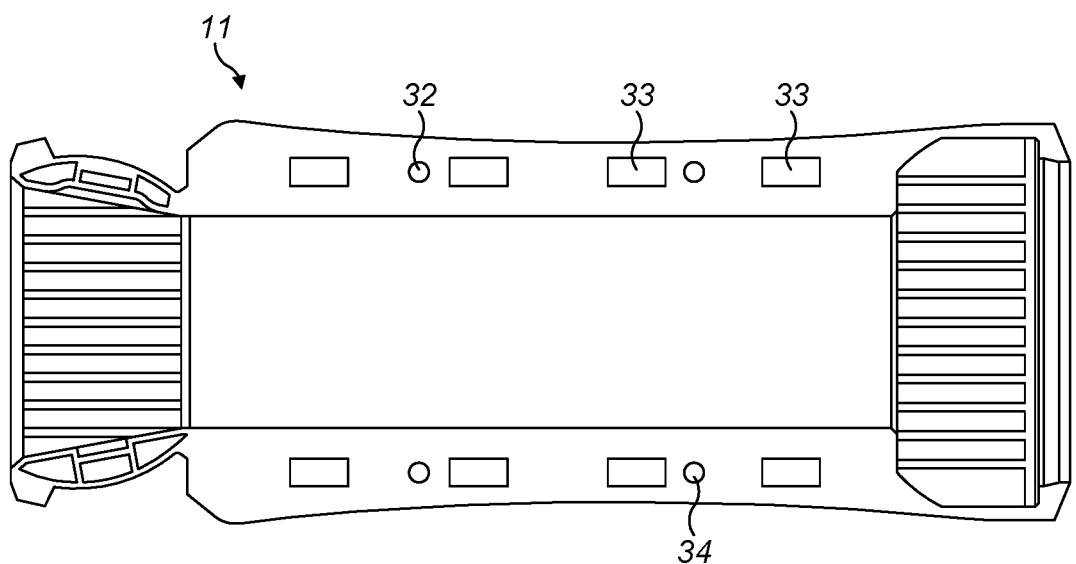

FIGS. 20 and 21 show a slightly modified protection member 11. The protection member 11 is similar to the projection member 10 except that the alignable openings 33 are rectangular rather than H shaped.

Various other modifications may be made without departing from the scope of the invention. For instance the two parts can be joined together differently, and integral snap fit clips or otherwise could be provided, rather than separate clips. A different arrangement could be used to permit the relative pivoting between adjacent ends. The apparatus may be made of different materials and/or by different processes. A band or bands may be provided around the protection member, and especially around the female formations, to hold the parts of the protection member together.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Protection apparatus for a flexible elongate member, the apparatus comprising a plurality of protection members, each protection member defining an opening through which a flexible elongate member can extend, with each protection member being interconnectable end to end with other such protection members to provide protection along the length of an elongate member, each protection member comprising two parts which are mountable together to define the opening through which an elongate member can extend, with the two parts together forming a female formation at one end, and a male formation at the other end, such that the female formation can receive a male formation on an adjacent protection member to interconnect the adjacent projection members, with the male and female formations being configured to permit a predetermined amount of relative pivotal movement between adjacent protection members, wherein each protection member comprises a generally cylindrical body, with the male and female formations at respective ends of the cylindrical body, wherein the exterior of the cylindrical body is provided by a plurality of ribs extending perpendicularly to each other, with recesses defined between the ribs, wherein filler material is located in at least some of the recesses.

2. Protection apparatus according to claim 1, wherein the two parts of the protection member are at least generally identical.

3. Protection apparatus according to claim 1, wherein the male and female formations are configured such that once a male formation is located in a female formation, the adjacent protection members are retained in an interconnected condition, and can only be separated if the two parts of a one of the protection members are separated.

4. Protection apparatus according to claim 1, wherein the male and female formations provide a ball and socket interconnection between adjacent protection members.

5. Protection apparatus according to claim 1, wherein the male and female formations are configured such that at a maximum relative inclination between adjacent protection members, there are three separate points of contact between the male and female formations, wherein the three separate points of contact are between: an outer end of the male formation and an inner part of the female formation; and an outer end of the female formation and an inner end of the male formation, both on the inside of the inclination, and the outer ends of the male and female formations at the outside of the inclination.

6. Protection apparatus according to claim 1, wherein inter engageable formations are provided between the two parts of each protection member, wherein:

the inter engageable formations provide a snap fit, the inter engageable formations are integrally formed with the remainder of each part of the protection member, or separate connecting members are provided extendible through respective alignable openings on each part of the protection member.

7. Protection apparatus according to claim 1, wherein the male formation has a part spherical profile with an outer rim, wherein the outside of the male formation outer rim provides at a maximum relative inclination one of the points of contact on the inside of the inclination, wherein the inside of the male formation outer rim provides the point of contact on the outside of the inclination.

8. Protection apparatus according to claim 1, wherein the female formation has a part spherical profile with an outer rim, wherein the outside of the female formation outer rim provides at a maximum relative inclination one of the points of contact on the inside of the inclination.

9. Protection apparatus according to claim 1, wherein the cylindrical body is waisted.

10. Protection apparatus according to claim 1, wherein the filler material is either lighter or heavier than water to respectively provide buoyancy or assist with sinking in water and on bottom stability.

11. Protection apparatus according to claim 1, wherein the filler material is of a material which provides abrasion protection.

12. Protection apparatus according to claim 1, wherein the filler material is provided on one side only of the protection members to provide orientation thereof in water.

13. Protection apparatus according to claim 1, wherein the protection members are made of a corrosion resistant material for use in subsea environments.

14. Protection apparatus according to claim 1, wherein the protection members are made of a polymer or plastics material.

15. Protection apparatus according to claim 14, wherein the protection members are formed by injection moulding.

16. Protection apparatus according to claim 1, wherein the protection members have a density of between 950 and 1150 $kgm^{-3}$.

17. Protection apparatus according to claim 1, wherein a band is provided around the outside of each female formation to ensure a respective male formation is retained therein.

18. Protection apparatus according to claim 14, wherein the protection members are made of polypropylene which is glass reinforced.

19. Protection apparatus according to claim 14, wherein the projection members are made of sheet moulding compound (SMC) or cast PU.

* * * * *